Oct. 15, 1968  R. NEUSCHOTZ  3,405,591
THREADED ELEMENTS HAVING DEFORMABLE SPACERS
Filed Nov. 28, 1966  3 Sheets-Sheet 1
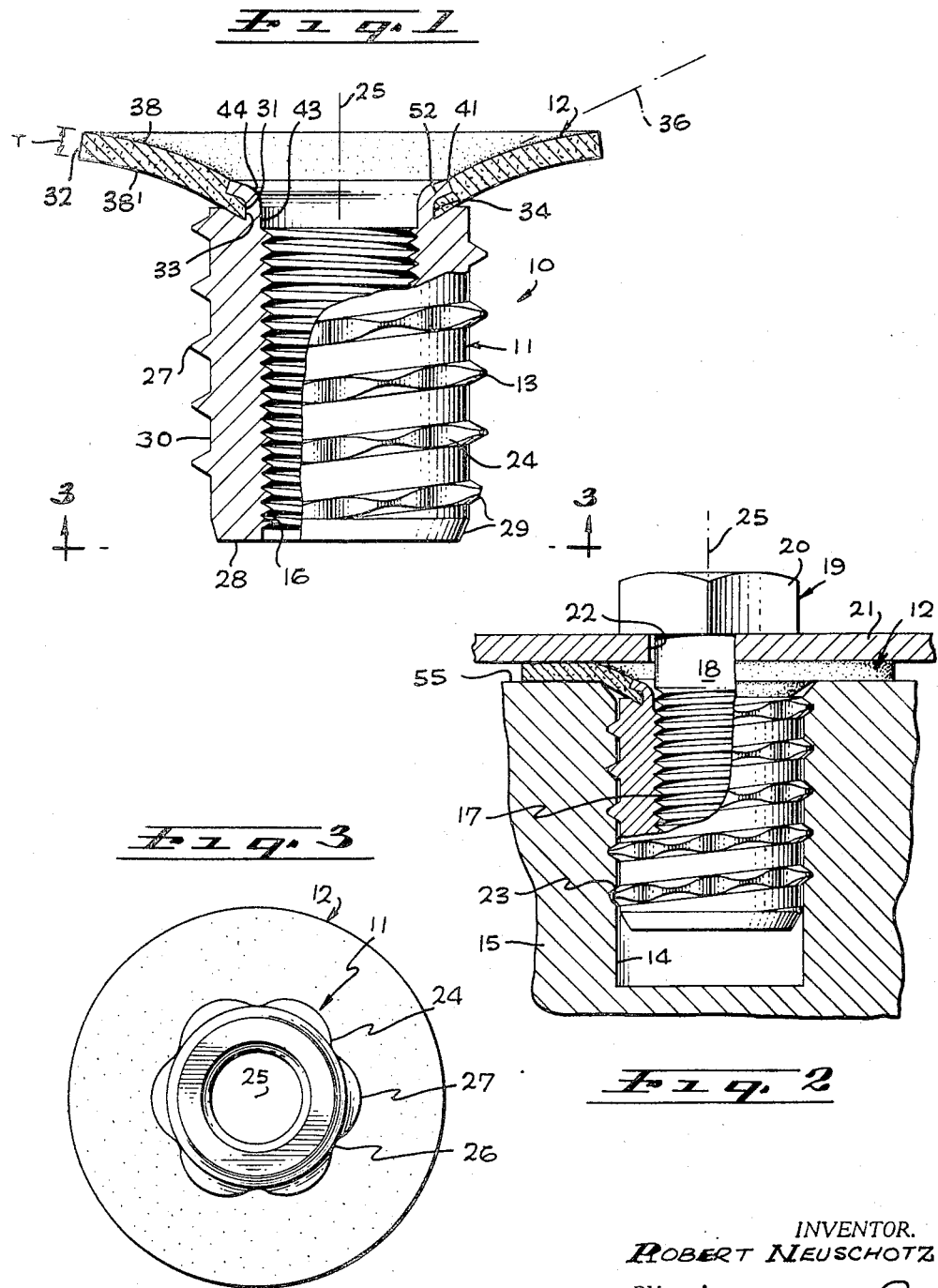
INVENTOR.
ROBERT NEUSCHOTZ
BY
William P. Green
ATTORNEY

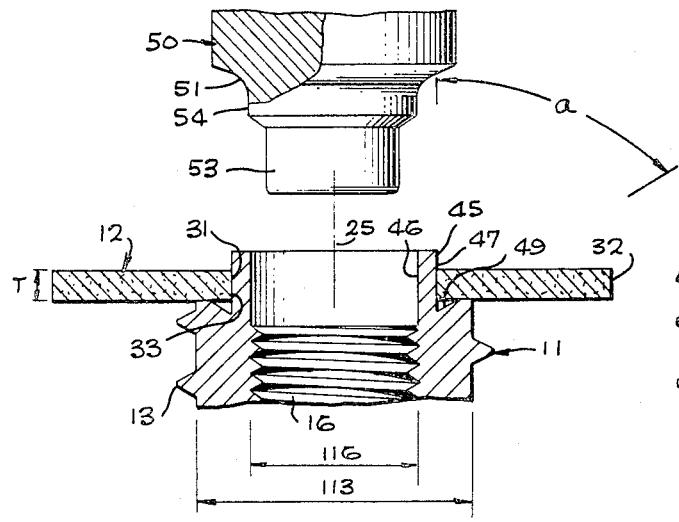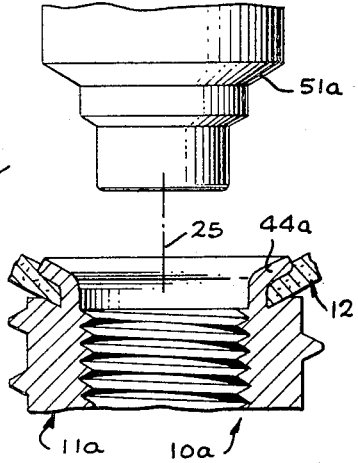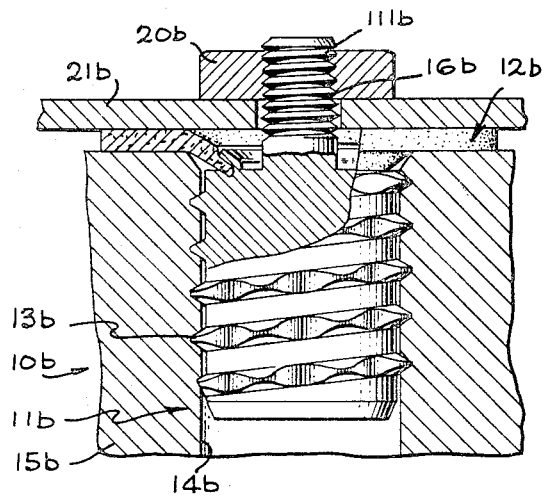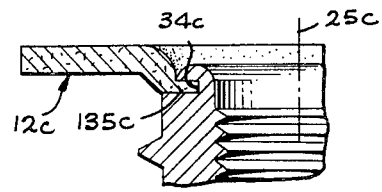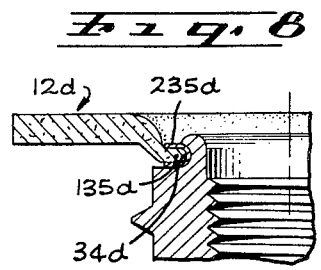
INVENTOR.
ROBERT NEUSCHOTZ
BY William P. Green
ATTORNEY

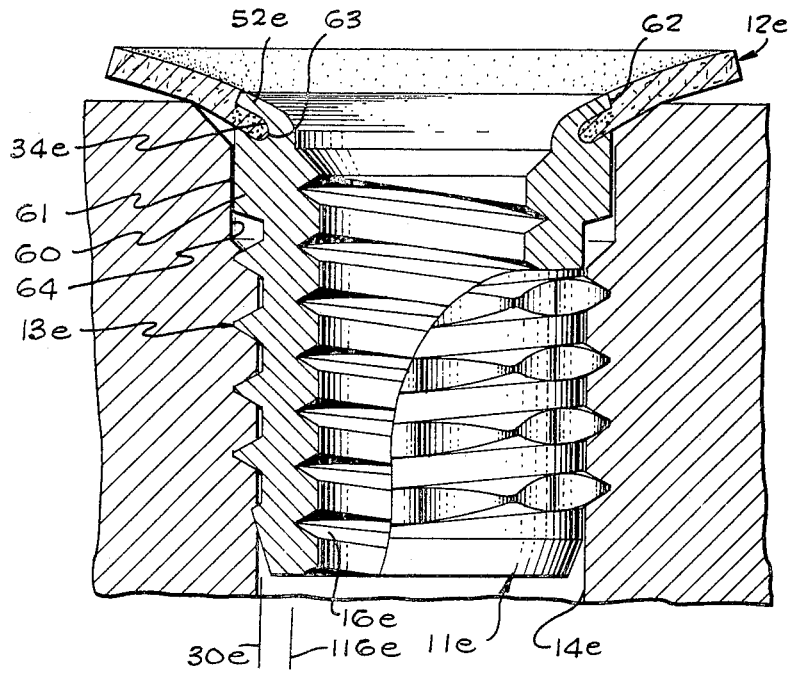
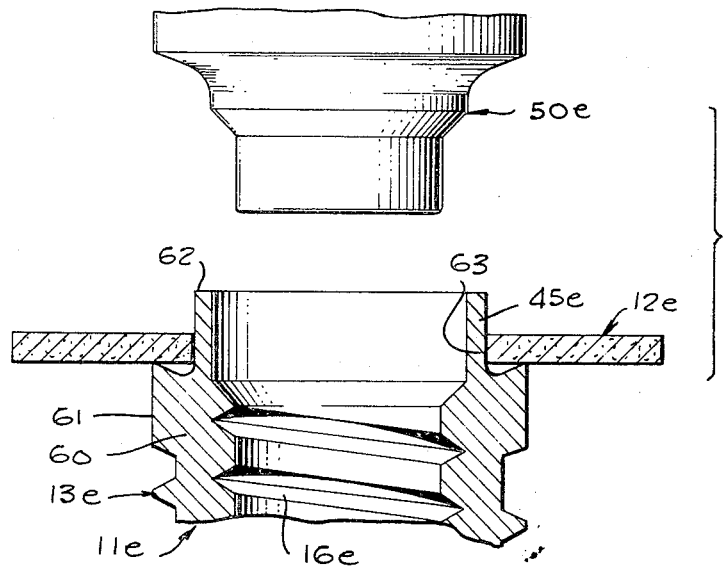

United States Patent Office 3,405,591
Patented Oct. 15, 1968

3,405,591
THREADED ELEMENTS HAVING
DEFORMABLE SPACERS
Robert Neuschotz, 1162 Angelo Drive,
Beverly Hills, Calif. 90210
Continuation-in-part of application Ser. No. 577,209,
Sept. 6, 1966. This application Nov. 28, 1966, Ser.
No. 597,455
13 Claims. (Cl. 85—9)

ABSTRACT OF THE DISCLOSURE

A fastener assembly to be connected into a recess in a carrier part, and including a fastener element having external threads to be screwed into the recess and having an additional set of threads accessible from the axially outer end of the fastener element for connection thereto of a coacting threaded part. The fastener element carries at a location axially outwardly beyond the external threads a deformable washer element which is receivable axially between the carrier part and a member secured thereto by the fastener element and the coacting threaded part, to space apart the member and carrier part.

This application is a continuation-in-part of my copending application Ser. No. 577,209, filed Sept. 6, 1966, on "Threaded Elements With Deformable Spacers," now abandoned.

This invention relates to improved fastener assemblies, such as threaded inserts or studs, of a type having external threads adapted to be screwed into a recess in a carrier part, and having an additional set of threads to which a coacting screw or other member may be secured in a manner attaching that member to the carrier part through the medium of the insert or stud.

The general object of the present invention is to provide a fastener assembly which includes a threaded element of the above discussed general type, but which is additionally so designed as to space apart the structures which are secured together by the fastener assembly, in a manner preventing the development of squeaks and rattles under vibratory conditions. More particularly, an assembly embodying the invention may be employed for securing together different parts of an automobile or other motor vehicle, or any other similar structure which may be subjected to extensive vibration in use, to thus render the structure permanently resistant to the development of looseness or rubbing contact between the parts which may cause squeaking, wear, etc. At the same time, the fastener assembly is so constructed as to facilitate its handling prior to and during installation, by forming it as a unitary combination of parts which are interconnected for handling as a single assembly.

Structurally, an assembly formed in accordance with the invention includes an element which carries the threads referred to above, and to which there is connected a spacing washer formed of a material which is more readily deformable than the body of the element. This washer is located axially outwardly beyond the external threads of the element, and projects radially outwardly beyond the element for reception between an outer surface of the carrier part and an opposed member which is tightenable against the washer when the threaded connection is completed. The washer is carried by the threaded element in a manner such that the two may be handled prior to installation as a unit, to attain the discussed facility of installation, and to also assure proper positioning of the washer relative to the insert in the ultimate complete tightened joint. For maximum simplicity, it is contemplated that the washer may be formed of a deformable typically fairly thick sheet of paper, which may be suitably impregnated or otherwise treated to improve its structural characteristics, as for instance to soften, strengthen or lubricate the washer, or to resist deterioration under contact with moisture or other fluids which may be encountered in use, or for any other purpose felt desirable in a particular installation.

The connection between the thread carrying element and the washer may be formed by so shaping the element itself as to interfit with and retain an inner edge portion of the washer. For this purpose, the element may have a flange which is deformed during assembly into tight gripping engagement with the inner edge of the washer, to lock that edge in fixed position relative to the threaded element, but with the radially outwardly projecting portion of the washer being free for some deformation. Also, the washer should in most instances be constructed and positioned to project axially outwardly a short distance beyond the axially outer extremity of the thread carrying element, to prevent direct contact of that element with another part which engages the washer, and thus assure against loss of the spacing effect. It is also desirable in most installations that the external threads of the element be of a self locking character, to automatically prevent unscrewing of the element from the carrier part after installation. Further, these threads may be of a self tapping character, to themselves form mating internal threads in the recess of the carrier part during the actual installing process.

The above and other features and objects of the invention will be better understood from the following detailed description of the typical embodiments illustrated in the accompanying drawing, in which:

FIG. 1 is a view partially in axial section and partially in elevation showing an insert assembly constructed in accordance with the invention;

FIG. 2 illustrates the assembly of FIG. 1 after its installation within a carrier part, and its connection to a coacting screw;

FIG. 3 is a view taken on line 3—3 of FIG. 1;

FIG. 4 shows the body of the insert and the washer prior to their permanent interconnection, and also shows a connecting tool;

FIG. 5 is a view similar to FIG. 4, but showing another type of connecting or crimping tool;

FIG. 6 is a view similar to FIG. 2, but showing the invention as applied to a stud rather than an insert;

FIGS. 7 and 8 are fragmentary views similar to a portion of FIG. 1, and showing two additional forms of the invention;

FIG. 9 is a view similar to FIG. 1, but showing another form of the invention; and FIG. 10 shows the structure of the FIG. 9 device before deformation of the element for retention of its spacing washer.

In FIG. 1, I have illustrated at 10 an insert assembly constructed in accordance with the invention, and including an insert body or element 11 and a carried spacing washer 12. Element 11 is essentially tubular, having external threads 13 adapted to be screwed into a recess such as that shown at 14 within a carrier part 15 (see FIG. 2). Internally, insert 11 contains a second series of threads 16 into which the mating threads 17 formed on shank 18 of a bolt or screw 19 are to be connected. Screw 19 in turn acts through engagement of its enlarged head 20 with a transverse plate or other member 21 to tighten the plate toward, and connect it to, carrier part 15. Plate 21 contains an opening 22 through which shank 18 of the screw 19 projects.

The element 11 may be formed of an appropriate rigid material, such as a suitable steel or other metal. External threads 13 of element 11 may be self tapping and self locking in character, to form internal threads 23 in the typically initially cylindrical side wall of recess 14, as element 11 is screwed into the recess to the FIG. 2 position. Preferably, the self tapping and self locking threads 13 are of the type disclosed and claimed in my U.S. Patent No. 3,200,691, entitled "Threaded Elements With Self-Tapping Peaks and Recesses." As taught in that patent, the threads 13 may have outer surfaces 24 which advance alternately radially inwardly and radially outwardly as they advance circularly about the main axis 25 of the element, and which thus truncate the various successive turns of threads 13 to form circularly spaced minimum diameter portions 26 of surfaces 24, and circularly intermediate maximum diameter peaks 27 of the threads (as viewed in the FIG. 3 end view). At the axially inner end 28 of element 11, threads 13 may be further truncated by annular chamfering at 29 (FIG. 1). Axially between their successive turns, threads 13 may have axially extending modified minor diameter surfaces 30. Except as truncated by outer surfaces 24 and chamfer 29, threads 13 may be of a uniform profile (and of unchanging major and minor diameters) along their entire helical extent. When a thread of the discussed type is screwed into the initially unthreaded cylindrical recess 14 of carrier part 15 (which is usually of a material softer than element 11, such as for instance aluminum, a rigid plastic, or the like), the smoothly rounded peaks 27 of threads 13 act to very effectively roll or form mating internal threads within the recess wall, without the formation of burrs or cuttings, and in a manner such that after the insert has been screwed to its final installed position, the deformed material of the carrier part tends to return slightly radially inwardly to positions circularly behind the various peaks 27, in a manner forming an effective lock preventing unscrewing rotation of the insert. The element 11 may be formed by commencing with bar stock of the peaked and recessed external configuration illustrated in FIG. 4, and threading that stock through the peaks and recesses so that the initial external configuration of the stock serves to automatically form outer surfaces 24 of the threads, which truncate the threads in the manner discussed above. Alternatively the element may be die cast to the shape illustrated.

Washer 12 may be formed of sheet material having a thickness T, and which may be cut to annular configuration, to have a central circular opening 31 and an outer circular peripheral edge 32, both centered about axis 25. The material from which washer 12 is formed is deformable or flexible, in contrast to the essentially rigid material from which body 11 is formed. Preferably, this material of the washer 12 has some resilience so that when confined between parts 15 and 21 as shown in FIG. 2, it will resist compression and will tend to return at least partially toward its uncompressed condition to thus resiliently maintain parts 15 and 21 in relatively cushioned and spaced conditions. A currently preferred material for use in forming washer 12 is paper or cardboard impregnated with glycerine and having an appropriate thickness, desirably between about .012 and .030 inch, and preferably about .020.

The circular radially inner edge 33 of washer 12, which defines opening 31, should be of a diameter slightly greater than the major diameter 116 of internal threads 16, and desirably between the major diameter of those internal threads 16 and minor diameter 113 of external threads 13. This edge and the immediately adjacent portion of washer 12 are received within an annular groove 34 formed in the material of element 11, and are confined tightly within that groove in a manner effectively connecting together element 11 and washer 12 as an assembly. In advancing radially outwardly from its inner edge 33, washer 12 may also advance axially outwardly, at an initial angularity to axis 25 represented by broken line 36 of FIG. 1, and may curve slightly to extend more directly radially outwardly toward its outer edge. Except at its inner extremity 33, the washer may be defined at its opposite sides by two annular parallel surfaces 38 and 38'. The inner edge portion of washer 12 may be somewhat deformed by virtue of its confinement within groove 34, so that its opposite side surfaces are not spaced apart as far as surfaces 38 and 38' which define the initial thickness of the sheet material from which the washer is formed.

The flaring angularity of the washer with respect to axis 25 may be such as to cause the axially outer surface 38 of the washer to project axially outwardly a substantial distance beyond the axially outer extremity 41 of element 11, to thereby prevent element 11 from contacting plate 21 in the FIG. 2 installed condition of the device. At the axially outer end of internal threads 16 of element 11, there may be formed in this element a short cylindrical surface 43 centered about axis 25, and merging with an annular outwardly curving surface 44 which defines the extremity 41 of element 11.

FIG. 4 shows the manner in which washer 12 may be initially secured to element 11. As seen in FIG. 4, element 11 may be first manufactured with an annular axially projecting portion 45 at its axially outer end, defined by inner and outer cylindrical surfaces 46 and 47. A flaring annular surface 49 may be formed on element 11, at a location to ultimately define an axially inner side wall of groove 34 of FIG. 1, and disposed at an angle $a$ with respect to surface 47 and axis 25, which angle may typically be approximately 60 degrees. The washer may initially be flat and in that condition be slipped onto projection 45 of element 11 (FIG. 4), following which the projection is deformed annularly from the FIG. 4 condition to the FIG. 1 condition, by axially inward movement of a deforming tool 50 against element 11. This tool 50 may have an annular curling surface 51 of the axial cross sectional configuration illustrated in FIG. 4, and adapted to engage projection 45 and annularly curl it radially outwardly and axially to form an annular flange 52 defining a second side wall of groove 34 and crimped tightly against the washer to securely attach it to element 11. In this deformed condition, the initially cylindrical surface 46 forms both the short cylindrical surface 43 and curved surface 44 of FIG. 1. During the deforming operation, element 11 is of course retained against axially inward movement by an appropriate backing structure (not shown). A cylindrical pilot portion 53 of tool 50 projects into the internal threads to assist in locating the tool relative to element 11 during the deforming operation. Also, an increased diameter cylindrical surface 54, which merges with curling surface 51 of the tool, is receivable within and contacts surface 46 of element 11 to retain it, and especially the portion of surface 46 which ultimately forms surface 43 of FIG. 1, against inward collapse.

FIG. 5 shows another form of deforming tool which may be employed in lieu of that shown in FIG. 4, and which has a frusto-conical surface 51a in place of curved surface 51, to form a correspondingly frusto-conical surface 44a on the end of element 11a.

In using the fastener assembly 10 of FIGS. 1 to 4, or the slightly altered assembly 10a of FIG. 5, a first step is to screw element 11 of assembly 10 (or element 11a of FIG. 5) into the initially unthreaded recess 14 of carrier part 15, and to the position illustrated in FIG. 2. During this installing process, an appropriate installing tool may engage internal threads 16 within element 11, and bear axially inwardly against annular end surface 44 of element 11, and then by rotation screw element 11 effectively into the carrier part. External self tapping threads 13 form mating threads in the wall of recess 14, and lock the element 11 against unscrewing rotation. In the final installed position, the axially outer extremity 41 of element 11 is desirably approximately aligned transversely of axis 25 with transverse planar surface 55 of the carrier part 15. Plate 21 may then be moved into position, following which screw 19 is passed through opening 22 in the plate and screwed into internal threads 16 of element 11, to a condition in which head 20 of the screw clamps plate 21 tightly against spacing washer 12. In this final FIG. 2 position, washer 12 effectively spaces plate 21 from any direct contact with element 11 or carrier part 15, to prevent the development of rattles, squeaks, or wear of either of the parts, and if washer 12 is resilient its cushioning effect assists in maintaining the joint permanently tight without looseness.

FIG. 6 shows another form of the invention consisting of a fastener assembly 10b which may be considered the same as assembly 10 of FIG. 1 except that element 11b has an axially outwarly projecting shank 111b carrying external threads 16b in lieu of the internal threads 16 of FIG. 1. External threads 13b of element 11b may be the same as threads 13 of FIG. 1, and may be screwed into a recess 14b within the carrier part 15b, with element 11b carrying a spacing washer 12b formed the same and serving the same purpose as washer 12 of FIG. 1. In retaining a plate 21b in position against washer 12b, there may be connected to the outer end of shank 111b of element 11b a nut 20b. As in the first form of the invention, washer 12b is carried by element 11b for handling as an assembly prior to and during installation, and serves the purpose of spacing plate 21b from carrier part 15b after formation of the complete joint.

FIG. 7 shows another form of the invention in which the radially innermost portion 135c of washer 12c extends directly radially or transversely with respect to axis 25c, and is clamped within a correspondingly transverse directly radially outwardly facing annular groove 34c in insert 11c.

In the form of FIG. 8, the transverse inner edge 135d of washer 12d is confined within and attached to an annular grommet 235d, formed of a suitable metal or other material more rigid than the washer. This grommet may be connected to the washer before its attachment to insert 11d, to in effect form a rigid inner edge of the washer which may be secured to insert 11d by reception within an annular groove 34d which is much shallower radially than groove 34 of FIG. 7.

FIGS. 9 and 10 show a form of the invention which is especially designed for manufacture by a die casting operation rather than entirely by a machining process. Additionally, this form of FIGS. 9 and 10 is useful in instances in which the wall thickness of insert 11e, radially between the minor diameter 30e of external threads 13e and the major diameter 116e of the internal threads 16e, is not great enough to enable formation of groove 34e entirely within that wall thickness. To achieve these purposes, insert 11e has at its axially outer end an enlarged diameter washer retaining portion 60, desirably having an externally cylindrical surface 61 of a diameter substantially greater than the minor diameter of external threads 13e, and nearer to the major diameter of those threads than their minor diameter. For best results, the diameter of cylindrical surface 61 is at least as great as or greater than the major diameter of threads 13e and optimally substantially equal to that major diameter as shown.

Groove 34e may be annular as in the other forms of the invention, and is formed by and between the discussed radially outwardly projecting enlargement 60 of insert 11e and an annular flange 52e on the insert. This flange may have its radially outer extremity 62 approximately aligned axially with the outer cylindrical surface 61 of portion 60. The annular inner edge portion 63 of washer 12e is received and confined and closely gripped within groove 34e. Desirably, groove 34e and the contained inner edge portion 63 of washer 12e are located primarily outwardly beyond the minor diameter 30e of external threads 13e, and for best results in this thin walled form of the insert they are located substantially entirely outwardly beyond that minor diameter.

FIG. 10 shows the manner in which a tool 50e forms flange 52e of FIG. 9 from an initially axially projecting annular portion 45e of the insert 11e, in a manner essentially the same as that illustrated in FIGS. 4 to 5 in connection with the first form of the invention. The use of the assembly of FIG. 9 is the same as that of FIG. 1, except that carrier part 15e is bored and threaded differently in a manner providing a desirably cylindrical counterbore surface 64 at the axially outer end of recess 14e in the carrier part, of a diameter corresponding substantially to, or slightly greater than, the diameter of external surface 61 of the insert, and of an axial length enabling reception of enlarged diameter portion 60 of the insert within the counterbore in the FIG. 9 installed position. After the device has been screwed to the FIG. 9 position, parts such as those shown at 19 and 21 in FIG. 2 may be connected to the insert in the manner illustrated in that figure.

The enlarged diameter portion 60 of the FIGS. 9 and 10 insert provides an unthreaded area of substantial cross section at which a die casting gate may be provided, to thus enable effective formation of the device by a die casting process. Also, this enlarged portion 60 allows for proper attachment of the washer to the insert even when the wall thickness of the rest of the insert is extremely thin.

I claim:

1. A fastener assembly to be connected to a carrier part containing a recess, comprising an element having external threads to be screwed into said recess, and having additional threads to be connected to a coacting member to secure said member to the carrier part through the medium of said element, a separately formed washer of a material more deformable than said element and carried by said element axially outwardly beyond said external threads and projecting radially outwardly beyond said element to form a spacer between an outer surface on said carrier part and an opposed second surface tightenable theretoward by said member, and means connecting said washer to said element for handling therewith as a unitary assembly prior to installation of said element in said carrier part, said washer being formed of sheet material having an inner edge secured by said connecting means to said element, said sheet material of the washer, as it advances radially outwardly from said inner edge, being shaped to also advance axially outwardly and to project axially beyond the axially outermost extremity of said element.

2. A fastener assembly to be connected to a carrier part containing a recess, comprising an element having external threads of self tapping and self locking configuration to be screwed into said recess, and having internal threads located essentially within said external threads and adapted to be connected to a coacting member to secure said member to the carrier part through the medium of said element, a separately formed washer of a material more deformable than said elements and carried by said element axially outwardly beyond said external threads and projecting radially outwardly beyond said element to form a spacer between an outer surface on said carrier part and an opposed second surface tightenable theretoward by said member, and means connecting said washer to said element for handling therewith as a unitary assembly prior to installation of said element in said carrier part, said washer being formed of sheet material having an inner edge secured by said connecting means to said element, said sheet material of the washer, as it advances radially outwardly from said inner edge, being shaped to also advance axially outwardly and to project axially beyond the axially outermost extremity of said element, said connecting means including an essentially annular shoulder on said element and an essentially annular flange integral with said element and spaced axially outwardly from said shoulder to form therewith a grove receiving and confining said inner edge of said washer.

3. The combination comprising a carrier part, a first fastener element having external threads screwed into a recess in the carrier part and also having an additional set of threads, a second fastener element having threads engaging said additional threads and tightenable thereby toward said carrier part, a member secured to the carrier part by said two fastener elements and tightenable toward the carrier part by threaded advancement of the second fastener element relative to the first fastener element, a washer formed separately from said first fastener element and of a material more deformable than the first fastener element and carried by the first fastener element axially outwardly beyond said external threads, and means connecting a radially inner portion of said washer to said first fastener element for handling of the washer with the first fastener element as a unitary assembly when said fastener elements are not threadedly connected to the carrier part or to one another, said washer having a portion projecting radially outwardly beyond said first fastener element and received axially between the carrier part and said member and spacing them axially apart.

4. The combination as recited in claim 3, in which said connecting means include a retaining flange formed on said first fastener element and retaining said radially inner portion of the washer against axially outward separation from the first fastener element.

5. The combination as recited in claim 3, in which said connecting means include a groove formed in the first fastener element and receiving and retaining said radially inner portion of the washer.

6. The combination as recited in claim 3, in which said additional threads of said first fastener element are internal threads located within the external threads, said second fastener element being a screw having external threads and having a head exerting axially inward force against said member toward the washer and carrier part.

7. The combination as recited in claim 3, in which said washer projects slightly axially beyond the axially outermost extremity of said first fastener element in a relation avoiding contact of said first fastener element with said member.

8. An assembly to be connected to a carrier part containing a recess, comprising a fastener element having external threads to be screwed into said recess, and having an additional set of threads accessible from the axially outer end of said fastener element for connection to said additional threads of a coacting threaded part from said axially outer end, a separately formed washer of a material more deformable than said fastener element and carried thereby at a location axially outwardly beyond said external threads, and means connecting a radially inner portion of said washer to said fastener element at said location axially outwardly beyond said external threads for handling of the washer with the fastener element as a unitary assembly prior to installation of said fastener element in the carrier part, said washer having a portion projecting radially outwardly beyond said fastener element at a location to be received axially between the carrier part and a surface tightenable theretoward by said coacting part to space apart the carrier part and said surface.

9. An assembly as recited in claim 8, in which said connecting means include a retaining flange formed on said fastener element axially outwardly beyond said external threads and retaining said radially inner portion of the washer against axially outward separation from the fastener element.

10. An assembly as recited in claim 8, in which said connecting means include a groove formed on the fastener element axially outwardly of said external threads and receiving and retaining said radially inner portion of the washer.

11. An assembly as recited in claim 8, in which said additional threads are internal threads located within said external threads and into which external threads of said coacting part are connectible from said axially outer end of the fastener element.

12. An assembly as recited in claim 8, in which said washer projects slightly axially beyond the axially outermost extremity of said fastener element to avoid contact of said fastener element with said surface.

13. As assembly as recited in claim 8, in which said external threads are of self tapping and self locking configuration.

References Cited

UNITED STATES PATENTS

| 2,824,663 | 2/1958 | Fischer. | |
| 2,943,661 | 7/1960 | Stern | 85—50 |
| 3,094,892 | 6/1963 | Topf | 85—50 |
| 3,181,899 | 5/1965 | McKnight | 85—9 |
| 3,200,691 | 8/1965 | Neuschotz | 85—47 |
| 3,259,161 | 7/1966 | Rosan. | |

FOREIGN PATENTS

| 1,270,437 | 7/1961 | France. |
| 827,677 | 1/1952 | Germany. |

MARION PARSONS, JR., *Primary Examiner.*